BROAD BAND AMPLIFIERS USING DISTRIBUTED RC NETWORK

Filed Jan. 26, 1967 Sheet 1 of 2

INVENTOR.
RICHARD A. RUSSELL

BY D. Gordon Angus

ATTORNEY

INVENTOR.
RICHARD A. RUSSELL
BY D. Gordon Angus
ATTORNEY

United States Patent Office 3,436,668
Patented Apr. 1, 1969

3,436,668

BROAD BAND AMPLIFIERS USING DISTRIBUTED RC NETWORK

Richard A. Russell, Pomona, Calif., assignor to Aerojet-General Corporation, El Monte, Calif., a corporation of Ohio Filed Jan. 26, 1967, Ser. No. 611,945
Int. Cl. H03f 3/04, 3/68
U.S. Cl. 330—21 8 Claims

ABSTRACT OF THE DISCLOSURE

This invention relates to broad band amplifiers, and particularly to broad band amplifiers utilizing a distributed network.

A broad band amplifier according to the present invention comprises a differential amplifier means having two inputs and an output. A distributed network having broad band attenuation characteristics interrelates the output and one of the inputs in negative feedback relationship so that the gain of the amplifier is at a maximum at two frequencies, one on either side of a center frequency, so that input signals at the other input having frequencies between the two frequencies are amplified.

The present invention pertains generally to broad band amplifiers, and more particularly to broad band amplifiers utilizing a distributed parameter network to achieve relatively broad and uniform bandpass characteristics.

There are many electronic applications in which filtering means having a relatively flat bandpass rejection characteristic, or alternatively apparatus possessing a flat or uniform amplification over a range of frequencies, is highly useful. For example, a flat bandpass amplifier is used extensively in radio communication receivers of all kinds, television video circuits, telemetry, FM apparatus and radar, to name a few. The flat broad band characteristic has only been obtainable heretofore by incorporating in electronic circuits inductors and transformers having relatively large physical dimensions. However, when such circuits are to be constructed from solid-state materials, either thin-film hybrid or monolithic, the use of individual inductors or transformers is usually precluded from a practical standpoint. This is true because suitable, relatively small-sized inductors of the required range of inductance, or transformers of the desired transforming capability, have not been yet devised for use in microelectronic applications. Unless space and weight requirements permit the use of conventional-sized inductance devices, other means and techniques must be adopted to obtain the results desired.

Various alternatives to the use of inductance are available in the communications art, such as a Wien bridge, twin-T and bridged-T null networks. However, for use in microelectronic circuits, RC circuits are an especially advantageous solution since resistors and capacitors are readily produced by known micro-electronic fabrication techniques over a wide range of values. It is particularly in connection with this type of circuit that the present invention pertains and by the techniques of which a special RC distributed parameter network, offering a relatively flat and broad range of frequency, can be fabricated.

It is, therefore, a primary object of the invention to provide a high frequency, broad band amplifier incorporating a distributed parameter network.

Another object of the invention is the provision of a distributed resistance-capacitance network that can be adjusted over a range of frequencies.

A still further object of the invention is the provision of a thin-film distributed parameter network as a component of an amplifier circuit whereby amplification is obtained over a relatively broad frequency range without the use of inductors or transformers.

Another object of the invention is the provision of an amplifier including a thin-film distributed network as a component thereof having relatively flat and broad response characteristics.

Still another object of the invention is the provision of a high frequency, broad band response amplifier that is non-microphonic and does not require magnetic shielding due to exclusion of inductive components.

Other objects and attendant advantages of this invention will be readily appreciated as the same become better understood by reference to the following detailed description when considered in connection with the accompanying drawings, wherein.

Figure 1A:
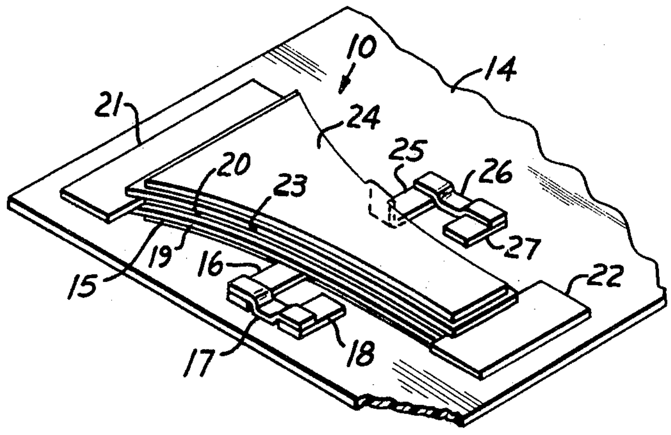
FIG. 1(A) is a perspective, greatly enlarged view of a thin-film distributed parameter network having a broad band attenuation characteristic.
Figure 1B:
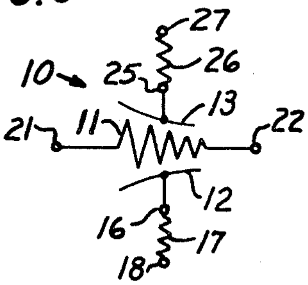
FIG. 1(B) is a schematic electrical equivalance representation of the distributed parameter network of FIG. 1(A)

In FIG. 1(A) there is illustrated a special distributed parameter network 10 having the electrical characteristics shown in the schematic FIG. 1(B), namely a tapered resistor 11 having a pair of capacitors 12 and 13 of different capacitance values arranged in parallel. Structurally, the special distributed network comprises a pair of plate-like electrodes which serve as respective plate electrodes for the capacitors 12 and 13, and the distributed tapered resistor 11 serves as a common electrode for both of the capacitors 12 and 13. It can be shown that with this type of construction, the distributed network exhibits a twin-peak frequency response. That is, the capacitor 12 in combination with the tapered resistor 11 provides attenuation for a specific frequency range; the capacitor 13 in combination with the tapered resistor provides attenuation for a frequency range differing from that of the first RC combination. This combined or twin-peaked attenuation characteristic provides two peaks of maximum attenuation for the network and the overlapping regions therebetween provide a substantially broad and uniform attenuation for those frequencies lying between the two maximums.

The term "distributed network" as used herein means an RC network which includes a resistor, and a capacitor whose capacitance is distributed along the length of the resistor in such a manner as to provide incrementally different capacitance along each increment of resistor.

Although it is considered within the contemplation and spirit of the present invention to construct the distributed parameter network to be described below by microscopic techniques, such as used for example in printed circuits or thick-film circuits, it will be particularly described here as being fabricated in thin-film form. The term "thin-film" as used herein means a film of material which has been deposited on another material by high vacuum evaporation or cathode sputtering techniques. Such techniques result in films commercially of the order of less than one micron in thickness.

Referring to the detailed structure of the distributed network, there is provided an insulative substrate 14 comprising a generally slab-like block of material having a relatively flat surface for receiving the various deposited layers thereon. Satisfactory materials from which the substrate 14 can be made are bulk quartz, or alumina, for example. Substrate 14 may serve as a base for depositing films of material to form other circuit components for an operative circuit. By way of example, many of the resistors and capacitors illustrated in FIG. 5, as well as network 10, may be deposited on substrate 14.

Figure 2:
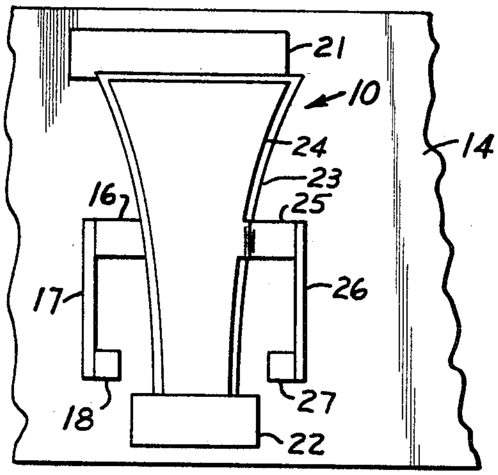
FIG. 2 is a top elevation of the distributed parameter network of FIG. 1(A)
Figure 3:
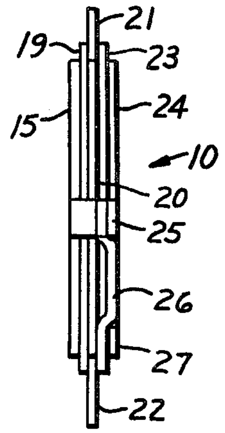
FIG. 3 is a side elevation of the distributed parameter network of FIGS. 1(A) and 2.

A first conducting plate or layer 15 is deposited onto the substrate surface by conventional vacuum evaporation techniques. As viewed in FIG. 2, the plate is generally elongated with both long sides of an exponentially curved and tapering condition, such that one end is relatively wide with both sides tapering down to a relatively narrow opposite end. Substantially midway between the extremities there is provided a terminal connection tab 16 of conductive material for connecting external apparatus to the plate 15.

A deposited resistor layer 17 is oriented substantially parallel to the long dimension of the plate 15 with one extremity electrically contacting the terminal tab 16. Also, the other extremity of the resistor 17 is provided with a terminal tab 18 for effecting electrical connection to other apparatus.

Suitable materials to use in fabricating the plate 15 and tabs 16 and 18 can include any of a number of different metals such as gold, silver or aluminum for example. Excellent results have been obtained with aluminum, which not only is a good conductor, deposits well by evaporation techniques, but also has compatible expansion characteristics with most other commonly used microelectronic materials. As to a satisfactory resistor material for making the layer 17, best results have been obtained to date with the binary and ternary metal-semiconductor materials described in copending patent application, "Metal Semiconductor Alloys for Thin-Film Resistors," by Robert P. Mandal, Ser. No. 582,499, assigned to the same assignee as this application. Suitable metal-semiconductor materials, as described in the said Mandal application, include: 41.7% by weight chrominum and 58.3% by weight germanium; 26.4% by weight chromium and 73.6% by weight germanium; 14.8% by weight chromium, 82.9% by weight germanium and 2.3% by weight iron; and 80.8% by weight zirconium and 19.2% by weight boron.

Over the conductive plate 15 and associated connector tab 16 a layer 19 of dielectric material is deposited in generously overlapping relation. The thickness and dielectric constant of the material used is important here since, as will be made clear later, this dielectric layer separates the electrodes of the capacitor 12, and, of course, the thickness and dielectric constant are factors determining the capacitance value. Particularly where exceptionally thin layers of dielectric are to be used, i.e., 100 angstroms or less, the dielectric material comprising SiO and $SiO_2$ described in the patent application entitled, "Dielectric Material and Process," by M. Penberg, Ser. No. 591,780, assigned to the same assignee as the present application, has been found to be especially advantageous. The material set forth in that application is amenable to deposition by high vacuum evaporative techniques and also possesses a good dielectric constant and high breakdown voltage even for extremely thin layers, which makes it ideal for the present purpose. It is understood, of course, that prior to the deposition of the dielectric layer 19 all other external circuital connections should be made to the tabs 16 and 18. That is, in the construction of the total circuit the deposition of successive layers of the distributed network is accomplished seriatim with all necessary connections being made to underlying layers before subsequent layers are deposited.

A layer 20 of electrical resistance material is deposited over the dielectric layer 19. This resistance layer, which may be formed from the same material as resistance layer 17, has an exponential configuration generally the same as the tapered elongated construction of the conductive plate 15 and is arranged in substantial registry with that plate. At each extremity, and in conducting electrical contact with the resistance layer 20, there are provided rectangular terminal connection means 21 at the larger or wider end of the resistance layer, and 22 at the narrower end, each extending the full length of the end portions and slightly beyond. The resistance layer 20 is the physical embodiment of the tapered resistor 11 illustrated in FIG. 1B. Also, this resistance layer acts as an electrode which in combination with the dielectric layer 19 and conducting plate 15 comprises the capacitor 12.

A second dielectric layer 23 is evaporatively deposited over the resistance layer 20 and associated terminal connection means. It is preferably deposited so as to completely cover the previously deposited conducting plate, dielectric and resistance layers. As in the case of dielectric layer 19, this layer may be made from the insulative material set forth in the copending application to M. Penberg referenced above. The desired thickness for the layer 23 is determinable by conventional mathematical techniques and depends upon the value desired for the capacitor 13.

Finally, a second conductive plate 24 of dimensions substantially identical to those of the first conductive plate 15 is deposited onto the dielectric layer 23 in registry with both the resistance layer 20 and the first conductive layer or plate 15. A deposited connective terminal tab 25 extends from a central portion of the plate 24, and, as is shown in plan view, extends to the side opposite that of the first conductive tab 16. The latter aspect, although not absolutely necessary, is advisable in order to avoid the possibility of crossover shorting relation between tab 25 and tab 16. Again, a resistance layer 26, which may be made from the same material as resistance layers 17 and 20, is deposited in overlying, electrically relating relation to the tab 25 and extends longitudinally of the conductive plate 24. For connection to other circuity the extremity of the resistor 26 includes a terminal tab 27.

Although not shown in the drawings, plate 24 and associated terminal tabs as well as the exposed portion of resistor 26 may be covered with a thin layer of dielectric material to prevent accidental shorting-out with other apparatus. This may also be advisable where the microcircuit is to be subjected to adverse environments or corrosive atmospheres which would tend to deteriorate the metal and resistor materials if they were left in an exposed condition.

Figure 6:
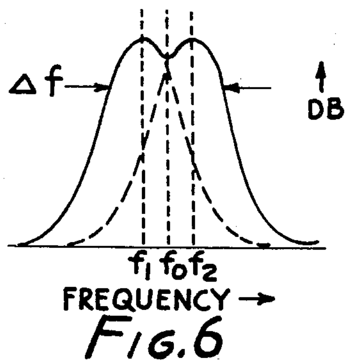
FIG. 6 is a graph depicting operation of the amplifier of FIG. 4 over a specified frequency range.

FIG. 6 depicts a decibel-to-frequency graph of the attenuation of the special distributed network. The network has a twin-peaked response characteristic, or two-notched maximum attenuation characteristic for signals of respective frequencies $f_1$ and $f_2$. As shown in the copending application to R. A. Russell et al., "Narrow Band Amplifier," Ser. No. 611,946 and assigned to the same assignee as the present invention, a tapered resistor having a plate associated therewith to form an RC distributed network provides a response characteristic that exhibits a sharp attenuation for a relatively narrow range of frequencies. In the present case, there are two such capacitors 12 and 13 related to a single tapered resistor, the capacitances of which differ from one another due to the differing thicknesses of the first and second dielectric layers 19 and 23 or due to the adjustment of parallel capacitors. Accordingly, there is a first peak at frequency $f_1$ and a second peak at frequency $f_2$ removed from the first peak. For frequencies lying between $f_1$ and $f_2$, there is a summation effect which provides a relatively wide and uniform attenuation characteristic between the two peaks. On the other hand, frequencies lying outwardly of the $f_1$–$f_2$ range are readily passed.

Figure 4:
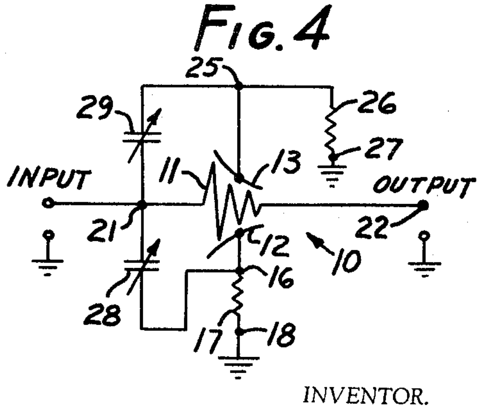
FIG. 4 is a schematic circuit diagram of a circuital adaptation of the special distributed network permitting adjustment of the rejection frequency range.

In FIG. 4 there is shown an adaptation of the basic distributed network permitting adjustment of the two peaks, and a corresponding adjustment of the response band width. A pair of variable capacitors 28 and 29 are connected, respectively, from tabs 16 and 25 to the terminal connection means 21. By adjusting the values of these capacitors there is effected a corresponding change in total capacitance of each pair of capacitors 12, 28 and 13, 29. This in turn is reflected as modifying the value of each frequency at which peak attenuation is obtained.

Figure 5:
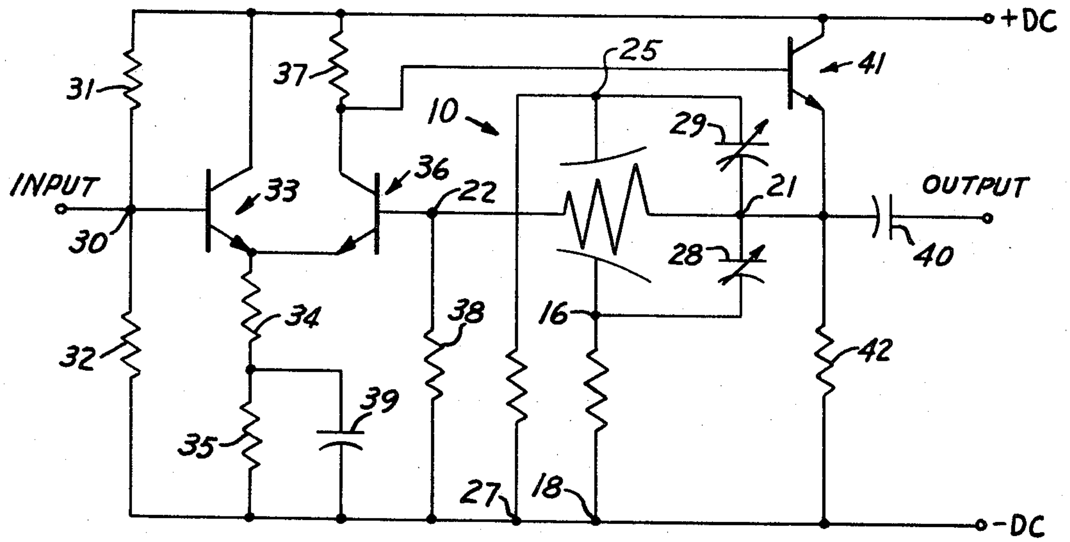
FIG. 5 is a schematic circuit diagram of a high frequency flat bandpass amplifier according to this invention.

In FIG. 5, a circuit schematic of the preferred form of a broad band amplifier is illustrated comprising a solid-state, differential input, negative feed-back amplifier in which the special distributed network already described is arranged in the feed-back path. Input for the amplifier is provided at the common connection point 30 of serially arranged resistors 31 and 32 which collectively form a voltage divider for biasing NPN transistor 33. Input signals are also fed directly to the base of the transistor 33 which is operated as an emitter follower with a pair of serially arranged resistors 34 and 35 interconnecting the emitter of the transistor to the free end of resistor 32. The latter connection point is connected to a source of negative potential at −DC. The collector of transistor 33 is electrically connected to voltage divider resistor 31 and to the positive side of the source at +DC.

A second NPN transistor 36 has its emitter directly connected to the emitter of transistor 33, its collector connected via load resistor 37 to +DC, and its base connected through a biasing resistor 38 to −DC. In order to prevent degenerization of the emitter circuit of transistor 36, a capacitor 39 provides a low impedance path to signals of frequencies above 1 megacycle per second from the common connection of resistors 34 and 35. The base of transistor 36 is also connected to one of the resistance terminals of the special distributed parameter network 10, or, more exactly, the terminal corresponding to the connection means 22 and the other resistance terminal (connection means 21) is connected via a DC blocking capacitor 40 to form the output for the circuit. The distributed network resistance with resistor 38 provides a bias on the base of transistor 36. The capacitor electrodes 12 and 13 of the distributed network are electrically connected through resistors 17 and 26, respectively, to −DC.

The emitter of a third NPN transistor 41 is connected to the common point of blocking capacitor 40 and the distributed network resistor, and also through a load resistor 42 to −DC. The collector of transistor 41 is electrically connected to +DC, while the base is connected to the collector of transistor 36.

In operation, an input signal to the base of transistor 33 will see a high impedance due to the emitter follower configuration. This is desirable to avoid overloading the source of the input signal. Transistor 36 operates as a feedback amplifier and is so arranged and connected with transistor 33 that the input and feedback signals are mixed in the differential amplifier affecting isolation of the distributed network 10 from the signal input. Transistor 41, also functioning as an emitter follower, provides a low driving impedance for the distributed network 10. Minimum feedback will occur at the frequencies $f_1$ and $f_2$ of highest attenuation of network 10, thereby providing maximum gains to the amplifier at those frequencies, and proportionately lower gains at other frequencies in accordance with the decibel-to-frequency curve illustrated in FIG. 6.

An input signal having a frequency between $f_1$ and $f_2$ will cause amplifier transistor 33 to operate to place a positive signal on the emitter of feedback transistor 36, thereby reducing the signal from transistor 36 which is in differential input relation to transistor 33. Thus, transistor 41 passes the amplified signal to the output. When the input signal is at a frequency out of the bandpass frequency of the amplifier, the signal appearing at terminal 21 of the input of the network 10 is passed to the base of feedback transistor 36 due to the low attenuation of the network at frequencies outside of the bandpass frequencies. This signal opposes the signal at transistor 33 due to the differential arrangement of transistors 33 and 36 so as to reduce the gain delivered to transistor 41, and thereby reduce the gain at the output.

The term "broad bandwidth amplifier" as used herein means one which has decibel-to-frequency gain characteristics plotted as essentially a plurality of individual single peaks at desired frequencies, attenuated less than three decibels from the maximum gain at frequencies between the peaks ($f_1$ and $f_2$) defining each end of the characteristics, and sloping downwardly to at least three decibels down from the maximum gain at frequencies outside of the $f_1$ to $f_2$ range.

Following is a list of specific parameter values that were used in a hybrid thin-film construction of the invention:

| | |
|---|---|
| Distributed network **10**: | |
| Thin-film resistor **20** | 2,300 ohms. |
| Dielectric film **19** | 3,000 angstroms thick of dielectric material having a constant-$k$=5. |
| Capacitor **12** | 102 picofarads. |
| Dielectric film **23** | 3,000 angstroms thick of dielectric material having a constant-$k$=5. |
| Capacitor **13** | 102 picofarads. |
| Resistor **17** | Approximately 40 ohms. |
| Resistor **25** | Approximately 40 ohms. |
| Transistors **33, 36** and **41** | 2N918. |
| Resistor **31** | 15,000 ohms. |
| Resistor **32** | 10,000 ohms. |
| Resistor **34** | 56 ohms. |
| Resistor **35** | 1,000 ohms. |
| Resistor **37** | 2,000 ohms. |
| Resistor **38** | 3,000 ohms. |
| Resistor **42** | 1,000 ohms. |
| Capacitor **39** | 1,500 picofarads. |
| Capacitor **40** | 500 picofarads. |
| Capacitor **28** | 5–25 picofarard range. |
| Capacitor **29** | 5–25 picofarad range. |

With a circuit constructed with circuit elements having the above values, a broad band, high frequency amplifier is provided having a center frequency ($f_0$) about 9.76 megacycles per second and a bandwidth ($\Delta f$) varying in width in accordance with the settings of variable capacitors 28 and 29. By adjusting capacitors 28 and 29 to desired $f_1$ and $f_2$ frequencies, a Q ratio between $f_0$ and $\Delta f$ may be obtained of the order of less than one, so that the bandwidth ($\Delta f$) of the example may, if desired, be greater than 10 megacycles centered around a center frequency ($f_0$) of 9.76 megacycles per second.

It is to be understood that the capacitors of the network 10 may be made identical and the peaks determined by varying capacitors 28 and 29 in parallel with the thin-film capacitors, or, capacitors 12 and 13 may be made differently, with different dielectric constants or thicknesses, so as to provide the twin-peak characteristic.

While a particular embodiment of the invention has been illustrated and described, it will be understood that the invention should not be construed as being limited thereto.

I claim:

1. A broad band amplifier having a negative feedback loop; an insulative substrate; a distributed network deposited on said insulative substrate and in said feedback loop, said network comprising: a first elongated layer of conductive material deposited on the substrate having one end wider than the other, the side portions of the first conductive layer tapering toward one another in an exponential curve, the first conductive layer having a first portion extending outwardly from one side portion between the two ends; a first electric layer deposited over the first conductive layer; a layer of electrical resistance material of similar geometry to that of the first conductive layer deposited over the first dielectric layer in a substantial registry with the first conductive layer; a pair of metal strips deposited onto the respective end margins of the resistance layer and electrically related to other amplifier circuit elements; a second dielectric layer deposited over the resistance layer, the first portion, and the metal strips; and a second conductive layer of similar geometry to that of the first conductive layer deposited over the second dielectric layer and in substantial registry with the first conductive layer, the second conductive layer having a second portion extending outwardly on the side opposite said first portion between its two ends.

2. An amplifier as in claim 1, further including a strip of resistance material deposited onto the substrate adjacent the first outwardly extending portion of the first conductive layer and having one end margin in electrical connection with said first conductive layer, a second strip of resistance material deposited onto the substrate adjacent the second outwardly extending portion of the second conductive layer and having one end margin in electrical connection with the said second conductive layer, and a first and second conductive strip deposited onto the opposite end margin of each of said first and second resistance strips, respectively, and electrically related to the other amplifier circuit elements.

3. An amplifier as in claim 2 in which each of said layers and each of said strips is a thin film.

4. A broad band amplifier according to claim 1 further including differential amplifier means having a first input adapted to receive input signals, a second input, and an output, said distributed network having broad band attenuation characteristics and being connected between the output and the second input in negative feedback relation whereby input signals having a frequency within the range of broad band attenuation of the distributed network are amplified, said differential amplifier comprising a first solid state amplifier connected to said first input and a feedback amplifier connected to said first solid state amplifier and to said second input.

5. A broad band amplifier according to claim 4 in which the first solid state amplifier comprises a first transistor having an emitter, a base and a collector, and the feedback amplifier comprises a second transistor having an emitter, a base, and a collector, means connecting the base of said first transistor to said first input, means connecting the base of said second transistor to said second input, means connecting the emitter of said first transistor to the emitter of said second transistor, means connecting the collector of said first transistor to one side of a source of potential, a third transistor having an emitter, a base and a collector, means connecting the base of said third transistor to the collector of said second transistor, means connecting the emitter of the third transistor to the output, and means connecting the collector of the third transistor to said one side of said source of potential.

6. A broad band amplifier according to claim 5 in which said first transistor is connected in emitter-follower relationship and said third transistor is connected in emitter-follower relationship.

7. A broad band amplifier according to claim 4 in which there is further provided a second solid-state amplifier connected to the output and to the distributed network to provide a low driving impedance for the network.

8. A broad band amplifier according to claim 5 further including first and second variable capacitors having one side connected to the emitter of said third transistor and having the opposite sides connected to said first and second conductive films, respectively.

References Cited

UNITED STATES PATENTS 2,694,185 11/1954 Kodama ------------ 333—70

FOREIGN PATENTS 763,850 12/1956 Great Britain.

OTHER REFERENCES

Hager, "Network Design of Microcircuits," Electronics, Sept. 4, 1959, pp. 44–49.

Howe, "Low-Frequency FET Amplifier Has Narrow Bandpass," Electronic Design, Jan. 4, 1965, vol. 13, No. 1, p. 72.

Price et al.: "A Tunable Solid-Circuit Filter Suitable For An I.F. Amplifier," Electronic Engineering, December 1963, pp. 806–812.

Roy et al.: "Notch Networks Using Distributed RC Elements," Proceedings of the IEEE, September 1966, pp. 1220–1221.

Valley et al.: Vacuum Tube Amplifiers, McGraw-Hill, New York, 1948, pp. 398–404.

ROY LAKE, *Primary Examiner.*

J. B. MULLINS, *Assistant Examiner.*

U.S. Cl. X.R.

330—28, 31, 38, 85, 109; 307—298